(12) United States Patent
Matsumoto et al.

(10) Patent No.: US 8,627,869 B1
(45) Date of Patent: Jan. 14, 2014

(54) MELT BONDING DEVICE FOR SEALING BELT-SHAPED SHEET

(71) Applicant: Unicharm Corporation, Shikokuchuo (JP)

(72) Inventors: Takayuki Matsumoto, Kanonji (JP); Shigetomo Takahashi, Kanonji (JP); Yuji Yamashita, Kanonji (JP); Hiroaki Goto, Kanonji (JP)

(73) Assignee: Unicharm Corporation, Shikokuchuo-Shi, Ehime (JP)

( * ) Notice: Subject to any disclaimer, the term of this patent is extended or adjusted under 35 U.S.C. 154(b) by 0 days.

(21) Appl. No.: 13/749,718

(22) Filed: Jan. 25, 2013

(30) Foreign Application Priority Data

Dec. 29, 2012 (JP) ................................ 2012-289177

(51) Int. Cl.
*B32B 37/00* (2006.01)

(52) U.S. Cl.
USPC ..................... 156/553; 156/580.1; 156/583.1; 156/583.4

(58) Field of Classification Search
USPC ................ 156/553, 580.1, 580.2, 581, 583.1, 156/583.4
See application file for complete search history.

(56) References Cited

U.S. PATENT DOCUMENTS

| | | | | |
|---|---|---|---|---|
| 4,961,805 | A * | 10/1990 | Siebert | 156/251 |
| 6,554,937 | B1 | 4/2003 | Kenmochi et al. | |
| 6,780,264 | B2 * | 8/2004 | Nakata et al. | 156/64 |
| 8,357,415 | B2 * | 1/2013 | Furusawa | 426/465 |

| | | | |
|---|---|---|---|
| 2002/0026699 | A1 | 3/2002 | Hayashi et al. |
| 2002/0148061 | A1 | 10/2002 | Tanaka et al. |
| 2003/0000934 | A1 | 1/2003 | Tanaka et al. |
| 2004/0149095 | A1 | 8/2004 | Miyatake et al. |
| 2005/0005381 | A1 | 1/2005 | Tanaka et al. |
| 2005/0039285 | A1 | 2/2005 | Tanaka et al. |
| 2005/0097695 | A1 | 5/2005 | Tanaka et al. |
| 2005/0097696 | A1 | 5/2005 | Tanaka et al. |
| 2005/0132521 | A1 | 6/2005 | Tanaka et al. |
| 2005/0139513 | A1 | 6/2005 | Miller |
| 2005/0177967 | A1 | 8/2005 | Tanaka et al. |
| 2005/0188490 | A1 | 9/2005 | Tanaka et al. |
| 2005/0193514 | A1 | 9/2005 | Tanaka et al. |
| 2005/0198760 | A1 | 9/2005 | Tanaka et al. |
| 2006/0016035 | A1 | 1/2006 | Tanaka et al. |
| 2006/0016036 | A1 | 1/2006 | Tanaka et al. |
| 2006/0101601 | A1 | 5/2006 | Fujiwara et al. |
| 2009/0049633 | A1 | 2/2009 | Takabayashi et al. |
| 2009/0165230 | A1 | 7/2009 | Tsuchiya et al. |
| 2009/0172904 | A1 | 7/2009 | Tsuchiya et al. |
| 2009/0255078 | A1 | 10/2009 | Wada et al. |
| 2010/0154156 | A1 | 6/2010 | Takabayashi et al. |
| 2012/0167736 | A1 | 7/2012 | Yokoe |

FOREIGN PATENT DOCUMENTS

| | | | |
|---|---|---|---|
| JP | 5245090 | A | 9/1993 |
| JP | 11323718 | A | 11/1999 |
| JP | 2000296083 | A | 10/2000 |
| JP | 2002069781 | A | 3/2002 |

(Continued)

*Primary Examiner* — James Sells
(74) *Attorney, Agent, or Firm* — Lowe Hauptman & Ham LLP

(57) ABSTRACT

Stoppers for preventing lifting of the worked sheet are comprised of two stoppers near the press and above the worked sheet at a predetermined space from the worked sheet, one of the stoppers arranged at an upstream side from the press and the other of the stoppers arranged at a downstream side from the press, whereby when the press seals the worked sheet and then moves upward, the preventive stoppers prevent the worked sheet from being lifted up.

7 Claims, 5 Drawing Sheets

(56) References Cited

FOREIGN PATENT DOCUMENTS

| | | |
|---|---|---|
| JP | 2003265390 A | 9/2003 |
| JP | 2003268663 A | 9/2003 |
| JP | 2004223692 A | 8/2004 |
| JP | 2005040641 A | 2/2005 |
| JP | 2005046645 A | 2/2005 |
| JP | 2005095665 A | 4/2005 |
| JP | 2005111284 A | 4/2005 |
| JP | 2005137929 A | 6/2005 |
| JP | 2005137930 A | 6/2005 |
| JP | 2005137931 A | 6/2005 |
| JP | 2005144198 A | 6/2005 |
| JP | 2005169148 A | 6/2005 |
| JP | 2005199077 A | 7/2005 |
| JP | 2005230573 A | 9/2005 |
| JP | 2005237975 A | 9/2005 |
| JP | 2006015164 A | 1/2006 |
| JP | 2006034990 A | 2/2006 |
| JP | 2006141483 A | 6/2006 |
| JP | 2006-265762 A | 10/2006 |
| JP | 2007002390 A | 1/2007 |
| JP | 2007029135 A | 2/2007 |
| JP | 2007029136 A | 2/2007 |
| JP | 2007111297 A | 5/2007 |
| JP | 2007135666 A | 6/2007 |
| JP | 2007135774 A | 6/2007 |
| JP | 2007136156 A | 6/2007 |
| JP | 2007159612 A | 6/2007 |
| JP | 2007209460 A | 8/2007 |
| JP | 2007209461 A | 8/2007 |
| JP | 2007236690 A | 9/2007 |
| JP | 2008006260 A | 1/2008 |
| JP | 2008119171 A | 5/2008 |
| JP | 2011-062802 A | 3/2011 |
| JP | 4675218 B2 | 4/2011 |
| JP | 2011084313 A | 4/2011 |
| JP | 4738311 B2 | 8/2011 |
| JP | 4878988 B2 | 2/2012 |
| JP | 2012-115783 A | 5/2012 |

\* cited by examiner

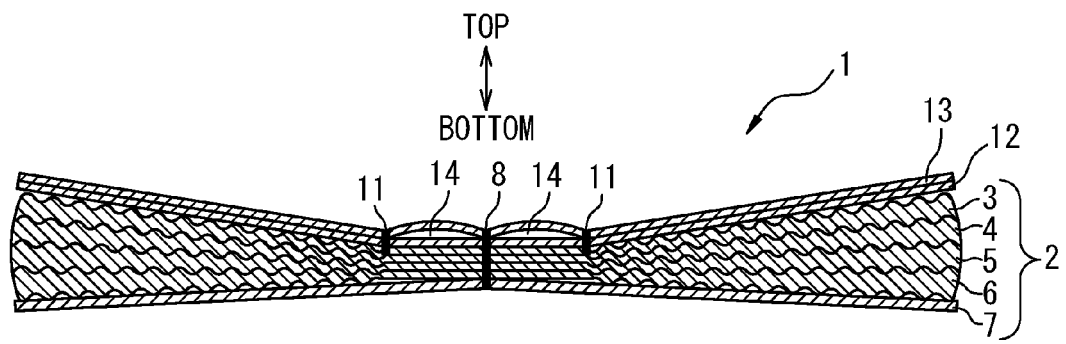
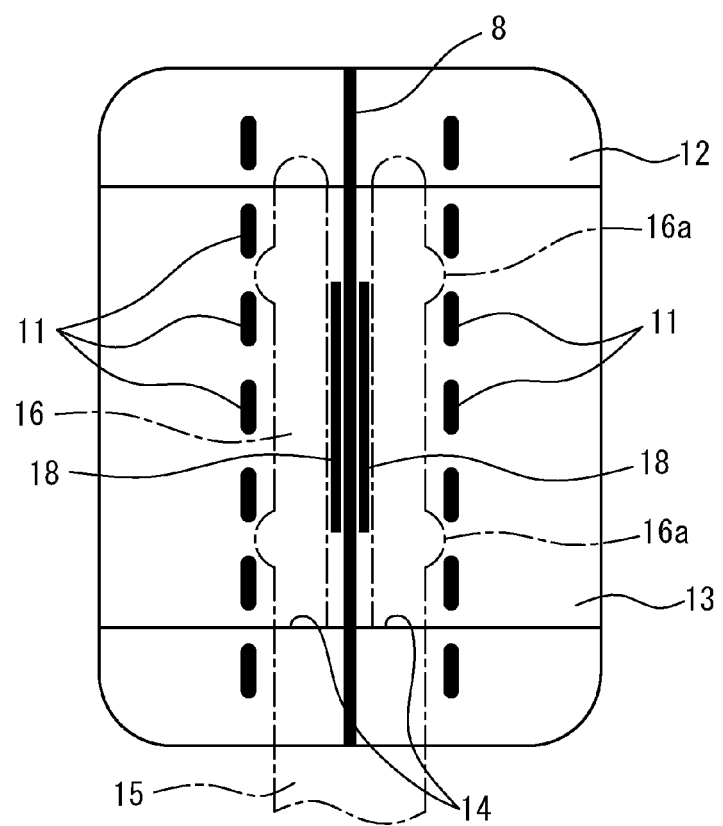

US 8,627,869 B1

MELT BONDING DEVICE FOR SEALING BELT-SHAPED SHEET

RELATED APPLICATIONS

The present application is based on, and claims priority from, Japanese Application Number 2012-289177, filed Dec. 29, 2012, the disclosure of which is hereby incorporated by reference herein in its entirety.

TECHNICAL FIELD

The present invention relates to a melt bonding device for intermittently sealing (bonding) a multilayer belt-shaped worked sheet.

BACKGROUND ART

As a melt bonding device for intermittently sealing a belt-shaped worked sheet, there is the one which is disclosed in the patent document PTL 1. The worked sheet is comprised from a thermoplastic resin etc., while the melt bonding device is a heat seal device. Further, the heat seal device is provided with a facing pair of seal blocks (having functions of press and anvil). The belt-shaped worked sheet is passed between one seal block and the other seal block. Further, by making the heated seal blocks approach each other in the state where the belt-shaped worked sheet has stopped and gripping and pressing the worked sheet from the top and bottom, the sheet is heat sealed (hot melt bonded). Further, the seal blocks are separated from each other and the grip on the worked sheet is released after the heat sealing to thereby end the heat sealing step. After that, the worked sheet is conveyed by a predetermined distance and stopped for the next heat sealing step.

When the seal blocks attempt to separate from the worked sheet after heat sealing, sometimes the worked sheet will not separate from the seal blocks and therefore the worked sheet will be lifted up while stuck to the seal blocks. In that case, if the worked sheet is attempted to be conveyed after the end of the heat sealing step, part of the stuck part (sealed part) will sometimes peel off and the stuck part (sealed part) will be damaged.

Further, a melt bonding device 80 separate from the melt bonding device of PTL 1 is shown in FIG. 6. The worked sheet S2 is comprised of two nonwoven fabrics S1 and a fiber bundle F1. The worked sheet S2 is the same as the multilayer web S2 which is shown in FIG. 4. At the surface of the worked sheet S2 facing the press 81, a fiber bundle F1 is formed. Further, the melt bonding device 80 is comprised of a press 81 and an anvil 82. The press 81 and the anvil 82 respectively have pressing-use projections 81a and support-use projections 82a.

Further, when the press 81 attempts to separate from the worked sheet S2 after heating sealing, the pressing-use projections 81a of the press 81 sometimes will not separate from the fiber bundle F1 of the worked sheet S2 and will lift it up while stuck to it. (A fiber bundle by nature more easily sticks at the time of heating compared with nonwoven fabrics.) In that case, part of the fibers will peel off from the sealed part or the group of fiber inside of the fiber bundle F1 will be broken up and just part of the fibers will be lifted up. This results in the inherent functions and form of the fiber bundle being remarkably impaired and makes the final product worthless in commercial value. Further, when the worked sheet is conveyed after the end of the heat sealing step, the melt bonded part (sealed part) will sometimes be damaged.

CITATIONS LIST

Patent Literature

[PTL 1] Japanese Patent Publication No. 2011-84313 A1

SUMMARY OF INVENTION

Technical Problem

The present invention was made in consideration of the above problems and has as its object the provision of a melt bonding device which is free from impairment of the function or form of a worked sheet or its melt bonded part when a press is raised after the end of a heat sealing step or when the worked sheet is conveyed after the end of the heat sealing step.

Solution to Problem

According to a first aspect of the present invention, the melt bonding device is a melt bonding device which intermittently seals a multilayer belt-shaped worked sheet, characterized in that the melt bonding device is provided with a facing press and anvil and stoppers for preventing lifting of the worked sheet, the worked sheet passes between the press and the anvil, the press moves from an upward position downward to press the worked sheet from its top side so as to seal the worked sheet, then moves upward, the anvil supports the worked sheet from a bottom side when the worked sheet is being sealed, the preventive stoppers are comprised of two stoppers, the two stoppers both arranged near the press and above the worked sheet at a predetermined space from the worked sheet, one of the stoppers arranged at an upstream side from the press and the other of the stoppers arranged at a downstream side from the press, and, when the press seals the worked sheet and then moves upward, the preventive stoppers prevent the worked sheet from being lifted up.

By provision of the stoppers for preventing lifting of the worked sheet, when the press is lifted up after the end of the sealing step in the state with the worked sheet stuck to it, the worked sheet abuts against the preventive stoppers. Due to this, only the press rises and the worked sheet is peeled off from the press and kept from rising together with the press. That is, the press and the worked sheet are unstuck and separate from each other. For this reason, there is no longer any impairment of the function or form of the worked sheet or its melt bonded part when the press is raised after the end of a heat sealing step or when the worked sheet is conveyed after the end of the heat sealing step.

Further, by having one of the stoppers arranged at the upstream side from the press and having the other of the stoppers arranged at the downstream side from the press, the press and worked sheet can stably separate from each other when unstuck (when the two are peeled apart).

According to a second aspect of the present invention, the melt bonding device is characterized in that the anvil moves from a downward position upward to support the worked sheet from the bottom side and moves downward after the worked sheet has been sealed.

This shows the mode of operation of the anvil.

According to a third aspect of the present invention, the melt bonding device is characterized in that the melt bonding device is a heat seal device where the press is heated or an ultrasonic wave sealing device where the press vibrates by ultrasonic waves.

This clarifies a specific aspect of the melt bonding device.

According to a fourth aspect of the present invention, the melt bonding device is characterized in that the worked sheet is formed with a fiber bundle at a side facing the press.

When the worked sheet is formed with a fiber bundle at a side facing the press, the fiber bundle more easily sticks to a heated press compared with for example a nonwoven fabric and in that case the inherent form and function are greatly impaired. Therefore, in a worked sheet in which a fiber bundle is formed at the side facing the press, the efficacy of arranging preventive stoppers increases.

According to a fifth aspect of the present invention, the melt bonding device is characterized in that the press has sealing-use projections, and edges of end faces of the sealing-use projections are chamfered.

If the edges of end faces of sealing-use projections were sharp, the edges would bite into the heated and melted worked sheet. When the press is raised after sealing, the worked sheet would easily remain stuck to the press. Further, by chamfering the edges, the areas of the end faces of the sealing-use projections become smaller and the worked sheet becomes harder to stick to the press.

According to a sixth aspect of the present invention, the melt bonding device is characterized in that the melt bonding device is a heat seal device where the press is heated, and the press is provided with a heat insulating plate at a side facing the worked sheet.

In the case of a heat seal device, provision of a heat insulating plate enables heat to be supplied from only the sealing-use projections to the worked sheet. That is, it becomes possible to efficiently supply heat to only locations scheduled for melt bonding.

According to a seventh aspect of the present invention, the melt bonding device is characterized in that the melt bonding device is a heat seal device where the press and the anvil are heated and a heating temperature of the press is higher than a heating temperature of the anvil. At the side of the worked sheet facing the press, stoppers for preventing lifting of the worked sheet are arranged. Even if the press rises stuck to the worked sheet at the time of sealing, the worked sheet will abut against the preventive stoppers and forcibly be unstuck whereby the two will peel apart. However, the side of the worked sheet facing the anvil is not provided with stoppers for preventing lifting of the worked sheet. Therefore, the heating temperature of the anvil is made lower than the heating temperature of the press so as to make the worked sheet harder to stick to the anvil (compared with the state stuck to the press).

BRIEF DESCRIPTION OF DRAWINGS

FIG. 2 is a cross-sectional view along the line X-X of FIG. 1.

FIG. 3 is a plan view of a cleaning member of FIG. 1.

DESCRIPTION OF EMBODIMENTS (Cleaning Member Produced by Method of Production According to Embodiment)

Figure 1:
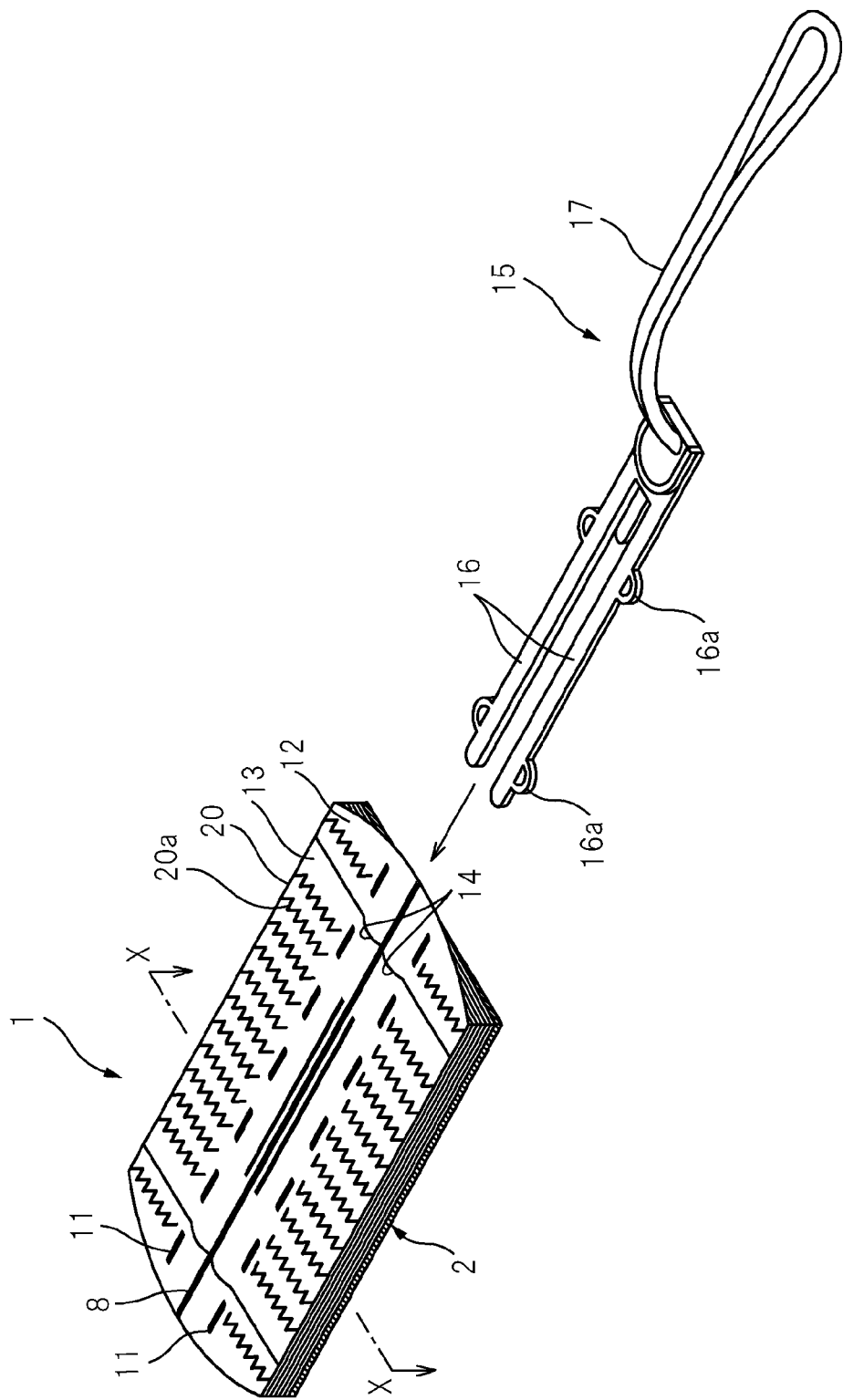
FIG. 1 is a cleaning member which is produced by a melt bonding device according to the present invention.

First, the configuration of a cleaning member 1 which is produced by the device of the present invention and a handle 15 which is fastened to this cleaning member will be explained in brief. FIG. 1 to FIG. 3 show the configuration of the cleaning member 1 and handle 15 according to the present invention, where FIG. 1 is a perspective view which shows the cleaning member 1 and handle 15 as a whole, FIG. 2 is a cross-sectional view along the line X-X of FIG. 1, and FIG. 3 is a plan view of a cleaning member 1 of FIG. 1.

That is, this cleaning member 1 is provided with a brush sheet (shaggy part) 2 which has a plurality of fibrous members 3, 4, 5, 6 and a sheet with slits 7 which is overlaid at the bottom part of the fibrous member 6, a substrate sheet 12 which is overlaid at the top part of the brush sheet 2, and a holding sheet 13 which is overlaid at the top part of the substrate sheet 12. Between the substrate sheet 12 and the holding sheet 13, receiving parts 14 are provided for receiving the insert parts 16 of the handle 15. Note that, when referring to FIG. 2, the top direction in FIG. 2 will be explained as "top" and the bottom direction as "bottom".

Note that, the cleaning member 1 is provided with two receiving parts 14 so as to enable insertion of two branched insert parts 16. However, the insert parts 16 may also be branched into three or more parts. The cleaning member 1 is provided with the receiving parts 14 in accordance with the number of branches at the insert parts 16.

The brush sheet 2, as shown in FIG. 2, is provided with four-layer structure fibrous members 3 to 6 comprised of a first fibrous member 3, a second fibrous member 4 which is overlaid at the bottom part of the first fibrous member 3, a third fibrous member 5 which is overlaid at the bottom part of the second fibrous member 4, and a fourth fibrous member 6 which is overlaid at the bottom part of the third fibrous member 5 and with a sheet with slits 7 which is overlaid at the bottom part of the fourth fibrous member 6 of this four-layer structure fibrous members 3 to 6. Note that, the fibrous members of the brush sheet 2 are not limited to a four-layer structure and may also be a single layer, two-layer, three-layer, or five-layer structure. Further, the brush sheet 2 need not be provided with the sheet with slits 7.

The first fibrous member 3, second fibrous member 4, third fibrous member 5, and fourth fibrous member 6 of the brush sheet 2 are treated by dust catching oil comprised mainly of for example liquid paraffin having the action of promoting adsorption of dust, dirt, etc.

The first fibrous member 3, second fibrous member 4, third fibrous member 5, and fourth fibrous member 6 of the brush sheet 2 can be formed by a fiber bundle, for example, from a tow by, for example, opening the tow. Note that, in the Specification, a "tow", as described in JIS L 0204-3: 1998, section 3.1.24, means a bundle of an extremely large number of filaments aligned together.

As the fiber bundle, for example, a fiber bundle comprised of thermoplastic fibers, a fiber bundle including thermoplastic fibers, etc. may be mentioned. As the material of the fibers forming the fiber bundle, for example, polyethylene, polypropylene, polyethylene terephthalate, nylon, rayon, etc. may be mentioned.

As the fibers forming the fiber bundle, for example, monofilaments and composite fibers, for example, core-sheath type composite fibers or side-by-side type composite fibers etc. may be mentioned. As the composite fibers, core-sheath type composite fibers are preferable. Furthermore, core-sheath type composite fibers with a melting point of the core higher than the melting point of the sheath are more preferable from the viewpoint of hot bondability.

As core-sheath type composite fibers, core-sheath type composite fibers with a core comprised of polypropylene or polyethylene terephthalate and a sheath comprised of polyethylene are more preferable and further core-sheath type composite fibers with a core comprised of a polyethylene terephthalate and a sheath comprised of polyethylene are still more preferable.

The denier of the fibers which forms the fiber bundle is preferably 1 to 50 dtex, more preferably 2 to 10 dtex. The fiber bundle may include a plurality of types of fibers which have the same denier or may include one or more types of fibers which have different deniers.

The fiber bundle may also be a bundle of slit fibers (fibers obtained by cutting and stretching a film in an elongated manner), split fibers (fibers obtained by dividing an elongated film into a net structure), etc.

In the method of production according to the present embodiment, the fibers which form the fiber bundle are comprised of crimped fibers. By forming the fibers by crimped fibers, it is possible to increase the bulk of the fiber bundle and possible to make the crimped parts structures which easily take in dust, dirt, etc. The fibers which form the fiber bundle may also be made ones which are not crimped.

The sheet with slits 7, as explained later, in the same way as the substrate sheet 12 and holding sheet 13, is formed from a nonwoven fabric which is comprised of thermoplastic fibers (hot bondable fibers) or a nonwoven fabric which includes thermoplastic fibers and is formed into a rectangular shape of substantially the same width and substantially the same length as the substrate sheet 12. The sheet with slits 7 is provided with sawtooth shaped slits (not shown) at predetermined intervals across the entire sheet with slits 7. Due to the slits, across the entire length of the two edge parts in the width direction of the sheet with slits 7, the two edges are formed with sawtooth shaped reed-shaped parts (not shown).

At the top part of the first fibrous member 3 of the brush sheet 2, as shown in FIG. 1 to FIG. 3, the substrate sheet 12 and the holding sheet 13 are overlaid in that order. Between the substrate sheet 12 and the holding sheet 13, receiving parts 14 are provided for insertion of insert parts 16 of the handle 15.

The substrate sheet 12 and the holding sheet 13 have rectangular shapes. The two sheets 12 and 13, as shown in FIG. 3, are set to the same dimensions in the width direction (left-right direction of FIG. 3), while the substrate sheet 12 is set longer in dimension in the length direction (up-down direction of FIG. 3). The holding sheet 13 is overlaid on the top part of the substrate sheet 12 so that two end parts of the substrate sheet 12 in the long direction stick out outward from the two ends of the holding sheet 13 in the long direction by predetermined lengths.

The substrate sheet 12 and holding sheet 13 are formed from nonwoven fabrics which are comprised of thermoplastic fibers (hot bondable fibers) or nonwoven fabrics which include thermoplastic fibers. As thermoplastic fibers, for example, polyethylene fibers, polypropylene fibers, polyethylene terephthalate fibers, polyethylene and polyethylene terephthalate composite fibers, polyethylene and polypropylene composite fibers, core-sheath type composite fibers comprised, for example, of a core comprised of polyethylene terephthalate and a sheath comprised of polyethylene, etc. may be mentioned.

As types of nonwoven fabrics, for example, thermal bond nonwoven fabrics, spunbonded nonwoven fabrics, spunlace nonwoven fabrics, etc. may be mentioned.

As other embodiments, the substrate sheet and the holding sheet are formed from thermoplastic resin films, for example, polyethylene films and polypropylene films. Further, as further embodiments, the substrate sheet and the holding sheet are formed from laminate sheets of nonwoven fabrics and resin films.

The substrate sheet 12 and the holding sheet 13 are integrally melt bonded by a later explained first melt bonded part forming device 158 together with all of the layers of the brush sheet 2 (first fibrous member 3, second fibrous member 4, third fibrous member 5, fourth fibrous member 6, and sheet with slits 7), whereby the cleaning member 1, as shown in FIG. 1 to FIG. 3, is formed with a first melt bonded part 8 extending in the long direction at the center part in the width direction. Furthermore, the substrate sheet 12 and the holding sheet 13 are integrally melt bonded at the two sides of the first melt bonded part 8 (left and right in FIG. 2) by a later explained second melt bonded part forming device 134 together with one layer of the brush sheet 2 (first fibrous member 3), whereby the second melt bonded parts 11 are formed. Two second melt bonded parts 11 are respectively formed intermittently in the long direction. By the first fibrous member 3 being melt bonded with the substrate sheet 12 and the holding sheet 13, the first fibrous member 3 tracks movement of these sheets 12 and 13, so in the state of use, the brush sheet 2 easily becomes broader and, and in turn, the cleaning efficiency is improved.

The substrate sheet 12 and the holding sheet 13 are melt bonded at the first melt bonded part 8 with all layers of the brush sheet 2 (first fibrous member 3, second fibrous member 4, third fibrous member 5, fourth fibrous member 6, and sheet with slits 7) and is melt bonded with the first fibrous member 3 of the brush sheet 2 at the two second melt bonded parts 11. Due to this, between the substrate sheet 12 and the holding sheet 13, a pair of receiving parts 14 are formed comprised of bag-shaped spaces which are defined by the first melt bonded part 8 and the two second melt bonded parts 11, which extend in the long direction of the substrate sheet 12 and the holding sheet 13, and which are open at the two ends in the long directions. The receiving parts 14 can receive the insert parts 16 of the handle 15.

The substrate sheet 12 and the holding sheet 13 are melt bonded by a later explained second melt bonded part forming device 134 with the first fibrous member 3 of the brush sheet 2 at the center parts of these. A pair of melt bonding lines 18 are further formed at a predetermined interval in the width direction of the substrate sheet 12 and the holding sheet 13. Between the pair of melt bonding lines 18, the first melt bonded part 8 is formed. The pair of melt bonding lines 18 are marks for management of the position of the first melt bonded part 8 at the stage of production. By managing whether the first melt bonded part 8 is arranged between the pair of melt bonding lines 18 by sensors etc., it is possible to separate good products and bad products.

The two second melt bonded parts 11 are provided intermittently at several locations in the long directions of the substrate sheet 12 and the holding sheet 13. By engaging the arc shaped projections 16a of the insert parts 16 of the handle 16 with nonmelt bonded parts of the two second melt bonded part 11, the insert parts 16 of the handle 15 can be prevented from being pulled out from the receiving parts 14.

The two edge parts of the substrate sheet 12 and the holding sheet 13 in the width direction (outside parts of two second melt bonded parts 11), as shown in FIG. 1, are provided with sawtooth shaped slits 20a at predetermined intervals along the long direction. Due to the slits 20a, the two edges are provided with sawtooth shaped reed-shaped parts 20. In another embodiment, the substrate sheet 12 and the holding sheet 13 are not provided with sawtooth shaped slits 20a and therefore the reed-shaped parts 20 are not provided.

Note that the handle 15 is formed from a plastic etc. As shown in FIG. 1, it has a pair of long plate shaped insert parts 16 which are arranged in parallel to each other, a pair of arc-shaped projections 16a which stick out from the outside surfaces of the two ends parts in the long directions of the insert parts 16, and a holder 17 which is provided integrally with one of the end parts of the insert parts 16.

By inserting the two insert parts 16 of the handle 15 inside the two receiving parts 14 of the cleaning member 1 configured in this way and engaging the projections 16a with non-melt bonded parts of the two second melt bonded parts 11, the cleaning member 1 is attached to the handle 15.

Further, by holding the holder 17 of the handle 15, bringing the brush sheet 2 into contact with a location being cleaned, and making it move in the desired direction, the dust, dirt, etc. of the location being cleaned is trapped by the brush sheet 2 and the location being cleaned is cleaned.

(Method of Production)

Figure 4:
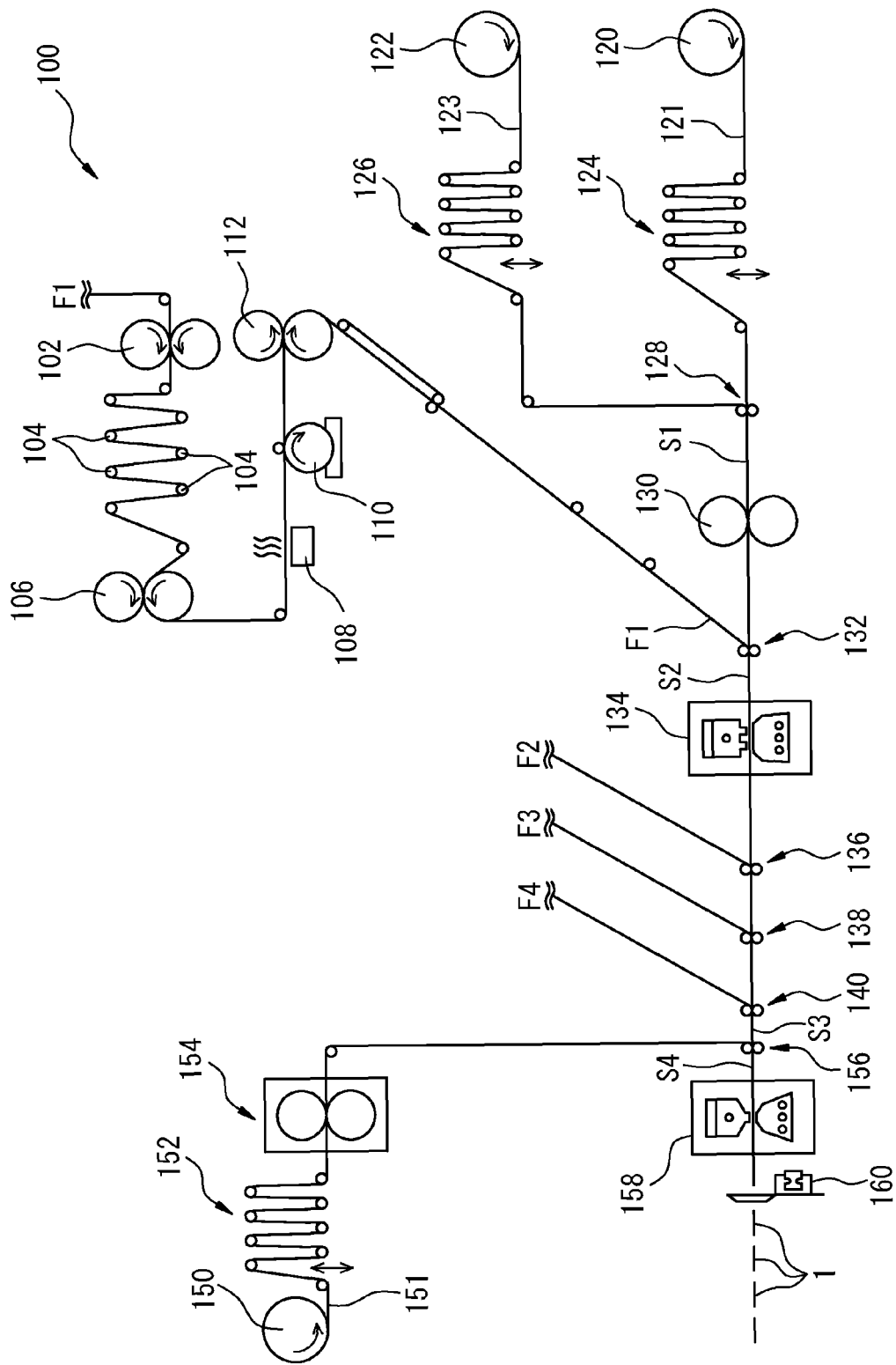
FIG. 4 is a schematic view which shows a production line which produces a cleaning member of FIG. 1 at which a melt bonding device according to the present invention is arranged.

Next, the method of production of the above-mentioned cleaning member 1 will be explained. FIG. 4 is a schematic view for explaining the method for producing the cleaning member 1 using a production system 100.

First, a crimped first fiber bundle F1 is taken out from a container (not shown) and is fed to first nip rolls 102. The first nip rolls 102 rotate by a certain peripheral velocity V1 whereby the first fiber bundle F1 is sent in the machine direction MD. After passing through the first nip rolls 102, the first fiber bundle F1 passes through the tension rolls 104 and reaches the second nip rolls 106.

The peripheral velocity V2 of second nip rolls 106 becomes faster than the peripheral velocity V1 of the first nip rolls 102. Due to this, between these nip rolls 102 and 106, the first fiber bundle F1 is given tension. As a result, the first fiber bundle F1 is opened.

Here, the tension rolls 104, for example, are formed from solid steel so as to become heavier in mass. The mass of the tension rolls 104 means that a considerable degree of force is required to rotate the tension rolls 104 by their inertia. As a result, the speed of movement of the first fiber bundle F1 which turns the tension rolls 104 while advancing from the first nip rolls 102 toward the second nip rolls 106 does not rapidly increase.

The tension rolls 104 are arranged to be able to gradually open the first fiber bundle F1 by the stroke between the first nip rolls 102 and the second nip rolls 106 becoming longer.

The first fiber bundle F1 which passes through the second nip rolls 106 passes through an air feeder 108 and oil applicator 110 and reaches third nip rolls 112. The peripheral velocity V3 of the third nip rolls 112 is slower than the peripheral velocity V2 of the second nip rolls 106. Therefore, the first fiber bundle F1 which is positioned between the second nip rolls 106 and the third nip rolls 112 is eased in the tension which was imparted and, further, the first fiber bundle F1 is further opened and the width of the first fiber bundle F1 is expanded.

Between the second nip rolls 106 and the third nip rolls 112, the air feeder 108 is provided. The first fiber bundle F1 is further opened.

Between the second nip rolls 106 and third nip rolls 112, the oil applicator 110 is further provided. The oil applicator 110 applies dust catching oil which has the action of promoting adsorption of dust, dirt, etc. to the first fiber bundle F1. The dust catching oil is, for example, oil mainly comprised of liquid paraffin.

The first fiber bundle F1 which passes the third nip rolls 112 proceeds to the merging part 132 after ending the opening step.

On the other hand, the nonwoven fabric 121 which forms the substrate sheet 12 is continuously unrolled from a nonwoven fabric roll 120. The nonwoven fabric 121 passes through dancer rolls 124 which include a plurality of rolls arranged in two top/bottom stages and where the rolls which are positioned at the bottom stage rock up and down and then is intermittently conveyed in the machine direction MD. Here, "intermittently conveyed" means the nonwoven fabric 121 is repeatedly advanced by exactly a certain distance, for example, substantially the width direction length of the cleaning member 1, in the MD direction, then stopped from being conveyed for a certain time. By the nonwoven fabric being intermittently conveyed in this way, it is possible to secure the time for melt bonding the component elements of the later explained multilayer web.

Similarly, the nonwoven fabric 123 which forms the holding sheet 13 is continuously unrolled from a nonwoven fabric roll 122. The nonwoven fabric 123 is passed through dancer rolls 126 which include a plurality of rolls arranged in two top/bottom stages and where the rolls which are positioned at the bottom stage rock up and down and is then intermittently conveyed.

The nonwoven fabrics 121, 123 merge at the merging part 128 to form a multilayer web S1. The multilayer web S1 passes the gather cutters 130 which have sawtooth shaped blades (not shown) intermittently formed at their surfaces in the peripheral direction. Due to this, the slits 20a which are shown in FIG. 1 are formed at the substrate sheet 12 and the holding sheet 13. In the method of production according to the present embodiment, the substrate sheet 12 and the holding sheet 13 are positioned at the bottommost layers of the later explained multilayer webs S1 to S4 and support other layers. (That is, the up-down direction are opposite to FIG. 2.)

Next, the multilayer web S1 merges at the merging part 132 with the above-mentioned fiber bundle F1 to form the multilayer web S2. At this time, the first fiber bundle F1 is configured so as to enable a certain degree of slack between the third nip rolls 112 and merging part 132. Due to this, there is the same action as if dancer rollers were provided between them.

In the method of production according to the present embodiment, the second melt bonded part forming device 134 is used to melt bond the substrate sheet 12, holding sheet 13, and first fiber bundle F1 included in the multilayer web S2 whereby two second melt bonded parts 11 (FIG. 3) are formed. Due to this, the multilayer web S2 is melt bonded across its thickness direction. The second melt bonded part forming device 134, for example, is a heat seal device, ultrasonic wave sealing device, etc. In the method of production according to the present embodiment, a heat seal device is used.

After this, at the multilayer web S2, a second fiber bundle F2 to fourth fiber bundle F4 which are opened by the same method as the first fiber bundle F1 are successively overlaid whereby a multilayer web S3 is formed.

On the other hand, the nonwoven fabric 151 which forms the sheet with slits 7 is continuously unrolled from a nonwoven fabric roll 150. The nonwoven fabric 151 is passed through dancer rolls 152 and then intermittently conveyed and, further, passes through gather rolls 154. The gather rolls 154 have continuous sawtooth shaped blades (not shown) at their surfaces in their peripheral directions. Due to this, the nonwoven fabric 151 which passes the gather rolls 154 is formed with sawtooth shaped slits (not shown). Due to the above, the sheet with slits 7 is formed from the nonwoven fabric 151.

The sheet with slits 7 merges with the multilayer web S3 at the merging part 156 to form the multilayer web S4.

In the method of production according to the present embodiment, the first melt bonded part forming device 158 is used to melt bond the multilayer web S4 as a whole whereby the multilayer web S4 is formed with the first melt bonded part 8 (see FIG. 3 etc.) Due to this, the multilayer web S4 is melt bonded across its thickness direction. The first melt bonded part forming device 154 is, for example, a heat seal device, ultrasonic wave sealing device, etc. In the method of production according to the present embodiment, a heat seal device is used.

The multilayer web S4 which passes the first melt bonded part forming device 158 is cut by a cutting device 160 whereby the cleaning member 1 is produced.

The cleaning member 1 which is produced by the method of production according to the present embodiment includes a sheet with slits 7, but a cleaning member which is produced by a method of production according to another embodiment does not include a sheet with slits.

Further, in the cleaning member 1 which is produced by the method of production according to the present embodiment, the receiving parts 14 are positioned at the surface of the cleaning member 1. In the method of production of a cleaning member according to another embodiment, by changing the order of overlay of the substrate sheet 12 and the holding sheet 13 and the fibrous members 3 to 6, the receiving parts 14 are arranged between any adjoining fibrous members 3 to 6. Due to this, the two surfaces of the cleaning member 1 can be used for cleaning. At this time, to facilitate insertion of the insert parts 16 into the receiving parts 14, the dimensions of the substrate sheet 12 and the holding sheet 13 in the long direction (up-down direction of FIG. 3) are preferably made longer than the fibrous members 3 to 6. These dimensions can be freely determined. Further, at this time, the sheet with slits 7 need not be used or the sheet with slits 7 may be arranged between the two surfaces of the cleaning member 1.

First Embodiment

Figure 5:
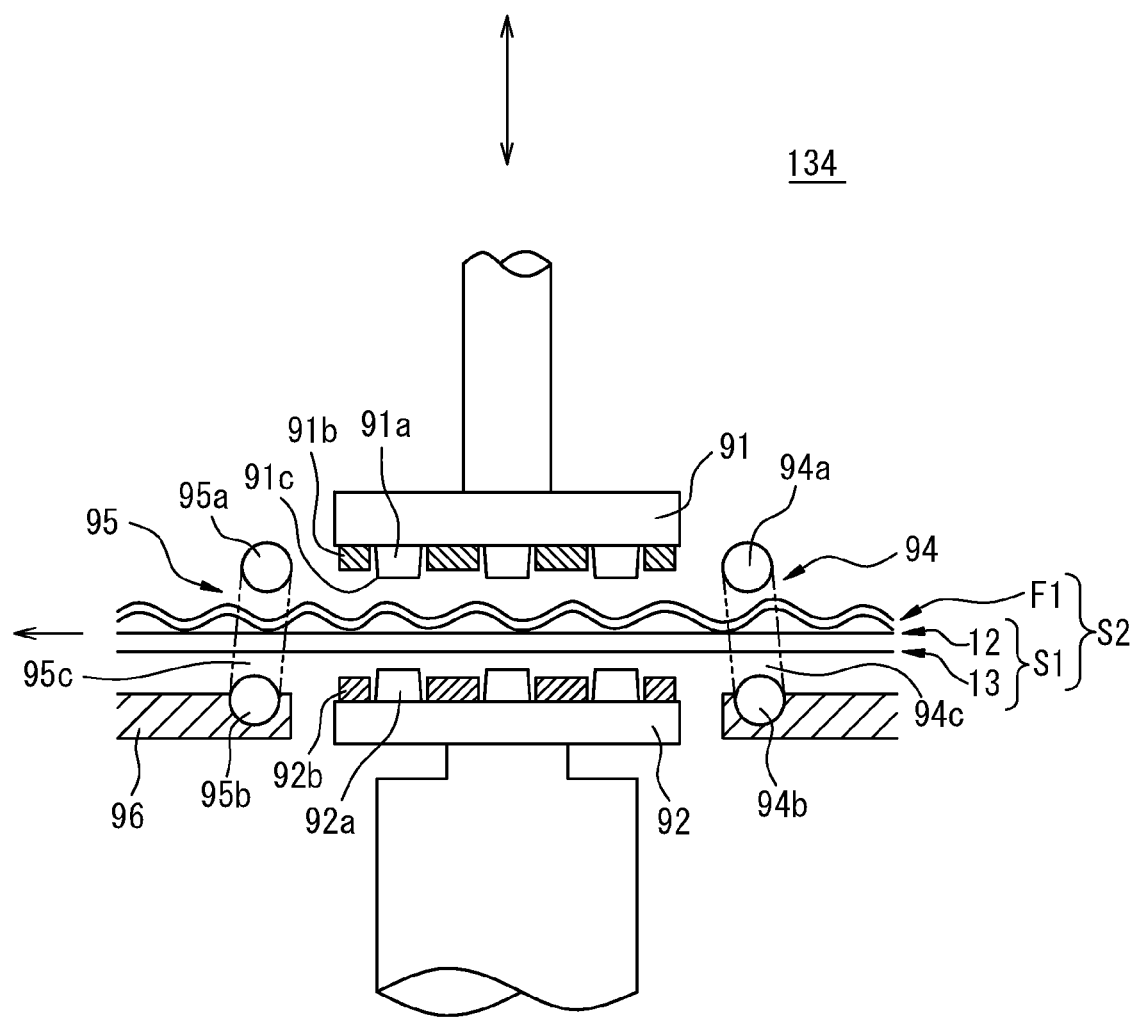
FIG. 5 is a schematic view of a melt bonding device according to the present invention.
Figure 6:
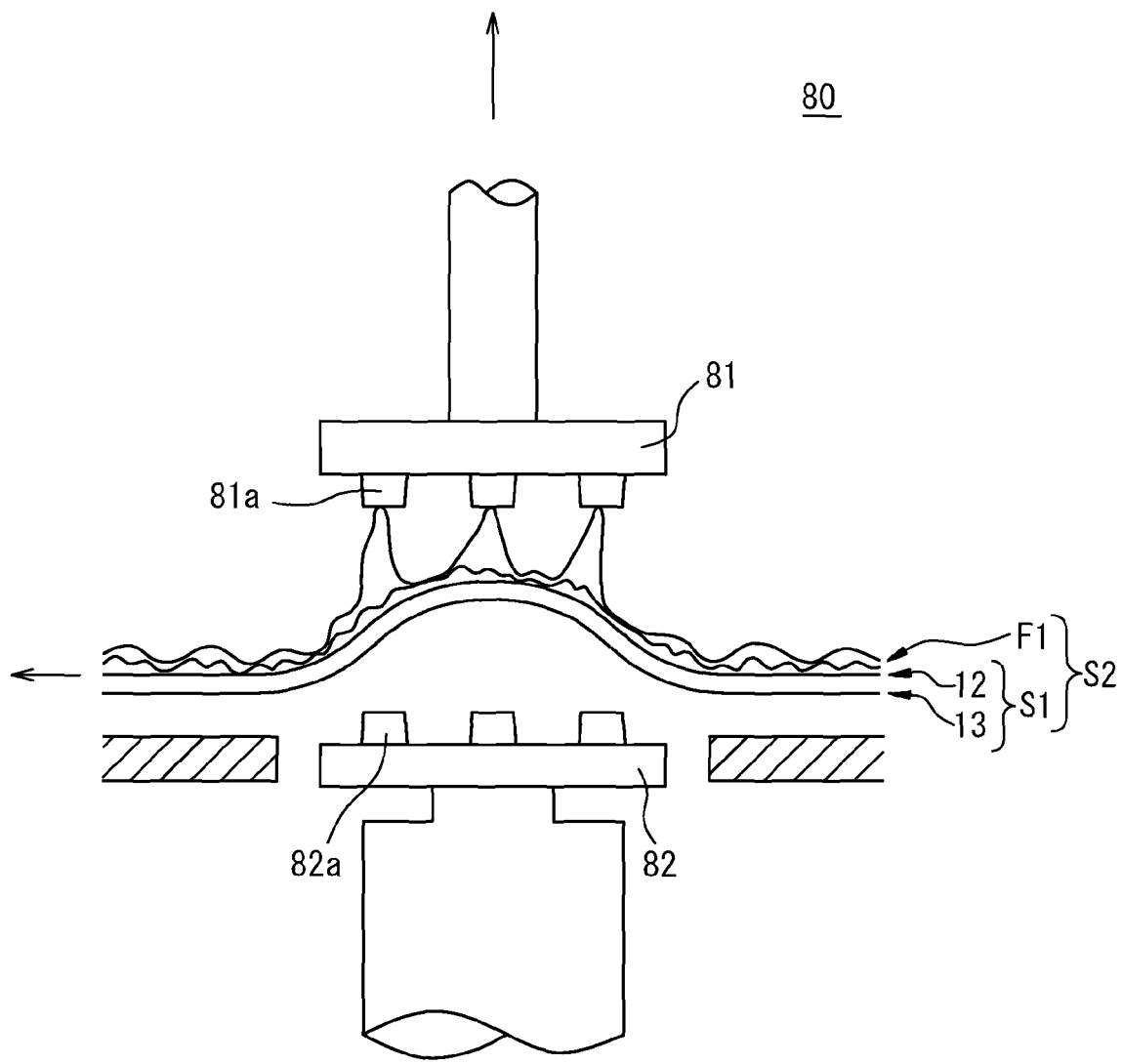
FIG. 6 a schematic view of a melt bonding device which is different from the citations list.

Here, a melt bonding device of a first embodiment of the present invention will be explained based on FIG. 5. The melt bonding device of the first embodiment is used in the above-mentioned second melt bonded part forming device 134. The melt bonding device 134 is used to melt bond the substrate sheet 12, holding sheet 13, and first fiber bundle F1 which are included in the belt-shaped multilayer web (worked sheet) S2 whereby the second melt bonded part 11 (FIG. 3) is formed. Due to this, the multilayer web S2 is melt bonded in its thickness direction. The melt bonded part forming device 134, for example, is a heat seal device, ultrasonic wave sealing device, etc. In the above-mentioned method of production, a heat seal device is used. Note that, in a heat seal device, the press is heated, while in an ultrasonic wave sealing device, the press vibrates by ultrasonic waves whereby heat of friction is generated. This is transmitted to the sealing part (bonding part) of the multilayer web S2 to melt bond the layers of the multilayer web S2. Below, the melt bonding device 134 will be explained as a heat seal device.

The melt bonding device 134 intermittently seals (bonds) a multilayer belt-shaped multilayer web S2 to form a second melt bonded part 11 and a pair of melt bonding lines 18 (FIG. 3). The melt bonding device 134 is provided with a facing press 91 and anvil (support table) 92 and stoppers 94, 95 for preventing lifting of the multilayer web S2. The multilayer web S2 passes between the press 91 and the anvil 92 to be conveyed in the arrow direction of FIG. 5 from the right to the left. The multilayer web S2 is formed with a fiber bundle F1 at the side of the multilayer web S2 facing the press 91. The anvil 92 supports the multilayer web S2 from the bottom side when the multilayer web S2 is being sealed.

The stoppers for preventing lifting of the multilayer web are comprised of two stoppers 94, 95. The two stoppers 94, 95 are both arranged near the press 91 and above the multilayer web S2 at a predetermined space from the multilayer web S2. One stopper 94 is arranged at an upstream side from the press 91 (based on flow of conveyance of the multilayer web S2) and the other stopper 95 is arranged at a downstream side from the press 91. The two stoppers 94, 95 are both provided with bars 94a, 95a, arms 94c, 95c (shown by imaginary lines), and arm ends 94b, 95b. The bars 94a, 95a extend in the width direction of the multilayer web S2 across the entire width in the horizontal direction and prevent the multilayer web S2 from being lifted up. The arms 94c, 95c are formed by bending the bars 94a, 95a by 90°. The arm ends 94b, 95b are fastened to the production line facility 96. Due to this, the bars 94a, 95a are fastened so as to straddle the multilayer web S2 at predetermined intervals from the multilayer web S2.

The press 91 is formed from steel or another metal. The press 91 has sealing-use projections 91a. Edges 91c of the end faces of the sealing-use projections 91a are chamfered. If the edges 91c of end faces were sharp, the edges 91c would bite into the heated and melted multilayer web S2. When the press 91 is raised after sealing, the multilayer web S2 would easily remain stuck to the press 91. Further, by chamfering the edges 91c, the areas of the end faces of the sealing-use projections 91a become smaller and the multilayer web S2 becomes harder to stick to the press 91.

The press 91 is provided with a heat insulating plate 91b at a side facing the multilayer web S2. The anvil 92 is similarly provided with a heat insulating plate 92b at a side facing the multilayer web S2. The heat insulating plates 91b, 92b are, for example, formed from rubber. Provision of the heat insulating plates enables heat to be supplied through only the sealing-use projections to the worked sheet. That is, it becomes possible to efficiently supply heat to only locations scheduled for melt bonding and becomes possible to prevent locations other than locations scheduled for melt bonding from being partially melt bonded.

The anvil 92 is also formed from steel or another metal. As shown in FIG. 5, the shape and configuration of the anvil 92 are similar to the press 91, so explanations will be omitted.

Further, the temperature to which the press 91 is heated is for example 142° C., while the temperature to which the anvil 92 is heated is for example 135° C. In this way, the temperature at which the press 91 is heated is higher than the temperature at which the anvil 92 is heated. The reason is as follows: At the side of the multilayer web S2 which faces the press 91, stoppers for preventing lifting of the multilayer web are provided. Even if the press 91 rises while stuck to the multilayer web S2 at the time of sealing, in the middle of the movement, the multilayer web S2 will abut against the preventive stoppers, so the further continued rise of the press 91 will forcibly cause the two to become unstuck and to peel apart. However, the side of the multilayer web S2 facing the anvil 92 is not provided with stoppers for preventing the multilayer web from being pulled down. Therefore, the heating temperature of the anvil 92 is made lower than the heating temperature of the press 91 so as to make it harder for the multilayer web S2 to stick to the anvil 92 (compared with the possibility of sticking to the press 91). Note that, provision of stoppers for preventing the multilayer web from being pulled down would lead to problems in the layout and cost of the facilities.

(Method of Operation of Melt Bonding Device)

Next, the method of operation of the melt bonding device will be explained. First, the multilayer web S2 is conveyed by a predetermined distance, then stopped. The anvil 92 moves from a downward position upward and supports the multilayer web S2 from the bottom side. The press 91 moves from the upward position downward and presses against the multilayer web S2 from the top side to thereby seal the multilayer web S2. After the sealing step ends, the press 91 moves upward. When the press 91 moves upward, the preventive stoppers 94, 95 prevent the multilayer web S2 from being lifted up. The anvil 92 moves downward after the multilayer web S2 is sealed.

Other Embodiments

The preventive stoppers 94, 95 need not be the above-mentioned bar shapes and may also be flat shapes. The point is that they have the function of being able to prevent the multilayer web S2 from being lifted up by a predetermined distance or more.

As explained above, it becomes possible to provide a melt bonding device which is free from impairment of the function or form of a worked sheet or its melt bonded part when a press is raised after the end of a heat sealing step or when the worked sheet is conveyed after the end of the heat sealing step.

The present application claim the benefit of the following patent applications, and the entire disclosure of which is incorporated herein by reference:

Japanese Patent Application No. 2012-289181 filed on Dec. 29, 2012, and US patent application claiming the priority thereof, Japanese Patent Application No. 2012-289182 filed on Dec. 29, 2012, and US patent application claiming the priority thereof, Japanese Patent Application No. 2012-289174 filed on Dec. 29, 2012, and US patent application claiming the priority thereof, Japanese Patent Application No. 2012-289189 filed on Dec. 29, 2012, and US patent application claiming the priority thereof, Japanese Patent Application No. 2012-289175 filed on Dec. 29, 2012, and US patent application claiming the priority thereof, Japanese Patent Application No. 2012-289188 filed on Dec. 29, 2012, and US patent application claiming the priority thereof, Japanese Patent Application No. 2012-289179 filed on Dec. 29, 2012, and US patent application claiming the priority thereof, Japanese Patent Application No. 2012-289184 filed on Dec. 29, 2012, and US patent application claiming the priority thereof, Japanese Patent Application No. 2012-289178 filed on Dec. 29, 2012, and US patent application claiming the priority thereof, Japanese Patent Application No. 2012-289176 filed on Dec. 29, 2012, and US patent application claiming the priority thereof, Japanese Patent Application No. 2013-002855 filed on Jan. 10, 2013, and US patent application claiming the priority thereof, as well as, Japanese Patent Application No. 2013-002857 filed on Jan. 10, 2013, and US patent application claiming the priority thereof.

Note that, the cleaning member illustrated in each figure is an example of the cleaning members which can be produced using the method of producing a cleaning member and the system of producing a cleaning member according to the present disclosure. The method of producing a cleaning member and the system of producing a cleaning member according to the present disclosure can be used to produce a cleaning member as described in, for example, Japanese Unexamined Patent Publication No. 2000-296083, 2003-265390, 2003-268663, 2004-223692, 2005-046645, 2005-095665, 2005-111284, 2005-137929, 2005-137930, 2005-137931, 2005-144198, 2005-169148, 2005-199077, 2005-230573, 2005-237975, 2006-015164, 2006-034990, 2006-141483, 2007-135774, 2007-209460, 2007-209461, 2007-029136, 2007-111297, 2007-135666, 2007-136156, 2007-159612, 2007-236690, 2008-006260, 2008-119171, and 2007-029135, and the entire disclosure of which is incorporated herein by reference.

The method of producing a cleaning member and the system of producing a cleaning member according to the present disclosure can be used to produce a cleaning member as described in, for example, U.S. Pat. No. 6,554,937B, US2002/148061A, US2003/0000934A, US2004/0149095A, US2005/0005381A, US2005/039285A, US2005/097695A, US2005/097696A, US2005/132521A, US2005/177967A, US2005/188490A, US2005/193513A, US2005/193514A, US2005/198760A, US2006/016035A, US2006/016036A, US2006/101601A, US2009/165230A and US2009/172904A, as well as US2009/049633A, US2009/255078A and US2010/154156A, and the entire disclosure of which is incorporated herein by reference.

The invention claimed is:

1. A melt bonding device which intermittently seals a multilayer belt-shaped worked sheet, characterized in that
said melt bonding device is provided with a facing press and anvil and stoppers for preventing lifting of the worked sheet,
said worked sheet passes between said press and said anvil,
said press moves from an upward position downward to press said worked sheet from its top side so as to seal said worked sheet, then moves upward,
said anvil supports said worked sheet from a bottom side when said worked sheet is being sealed,
said preventive stoppers are comprised of two stoppers, said two stoppers both arranged near said press and above said worked sheet at a predetermined space from said worked sheet, one of said stoppers arranged at an upstream side from said press and the other of said stoppers arranged at a downstream side from said press, and,
when said press seals said worked sheet and then moves upward, said preventive stoppers prevent said worked sheet from being lifted up.

2. The melt bonding device as set forth in claim 1, characterized in that said anvil moves from a downward position upward to support said worked sheet from the bottom side and moves downward after said worked sheet has been sealed.

3. The melt bonding device as set forth in claim 1, characterized in that said melt bonding device is a heat seal device where said press is heated or an ultrasonic wave sealing device where said press vibrates by ultrasonic waves.

4. The melt bonding device as set forth in claim 1, characterized in that said worked sheet is formed with a fiber bundle at a side facing said press.

5. The melt bonding device as set forth in claim 1, characterized in that said press has sealing-use projections, and edges of end faces of said sealing-use projections are chamfered.

6. The melt bonding device as set forth in claim 3, characterized in that said melt bonding device is a heat seal device where said press is heated, and said press is provided with a heat insulating plate at a side facing said worked sheet.

7. The melt bonding device as set forth in claim 3, characterized in that said melt bonding device is a heat seal device where said press and said anvil are heated and a heating temperature of said press is higher than a heating temperature of said anvil.

\* \* \* \* \*